United States Patent
Heo et al.

(10) Patent No.: US 11,957,145 B2
(45) Date of Patent: Apr. 16, 2024

(54) ALL-PURPOSE SEASONING SOY SAUCE COMPOSITION, ALL-PURPOSE SEASONING SOY SAUCE, PREPARATION METHOD THEREFOR AND CHAM SAUCE USING SAME

(71) Applicants: WOORI FOODS CO., LTD., Gimpo-Si (KR); Seung Kyu Park, Goyang-si (KR)

(72) Inventors: Seong Yong Heo, Bucheon-Si (KR); Seung Kyu Park, Goyang-si (KR)

( * ) Notice: Subject to any disclaimer, the term of this patent is extended or adjusted under 35 U.S.C. 154(b) by 933 days.

(21) Appl. No.: 16/964,256

(22) PCT Filed: Jan. 18, 2019

(86) PCT No.: PCT/KR2019/000730
§ 371 (c)(1),
(2) Date: Feb. 19, 2021

(87) PCT Pub. No.: WO2019/146964
PCT Pub. Date: Aug. 1, 2019

(65) Prior Publication Data
US 2021/0186071 A1  Jun. 24, 2021

(30) Foreign Application Priority Data
Jan. 26, 2018 (KR) .......... 10-2018-0010062

(51) Int. Cl.
A23L 27/50 (2016.01)
A23L 23/00 (2016.01)
A23L 27/24 (2016.01)

(52) U.S. Cl.
CPC ............... *A23L 27/50* (2016.08); *A23L 23/00* (2016.08); *A23L 27/24* (2016.08); *A23V 2002/00* (2013.01)

(58) Field of Classification Search
CPC .......... A23L 27/50; A23L 23/00; A23L 27/24; A23L 33/105
See application file for complete search history.

(56) References Cited

FOREIGN PATENT DOCUMENTS

| KR | 10-0671746 B1 | 1/2007 | |
|---|---|---|---|
| KR | 10-2009-0038165 A | 4/2009 | |
| KR | 10-2012-0021352 A | 3/2012 | |
| KR | 10-2013-0071584 A | 7/2013 | |
| KR | 10-2016-0058210 A | 5/2016 | |
| WO | WO-2015108321 A1 * | 7/2015 | .............. A23L 1/39 |

OTHER PUBLICATIONS

WO-2015108321-A1 (Clarivate machine translation) (Year: 2015).*

* cited by examiner

*Primary Examiner* — Nikki H. Dees
*Assistant Examiner* — Andrew E Merriam
(74) *Attorney, Agent, or Firm* — KORUS Patent, LLC; Seong Il Jeong

(57) ABSTRACT

The present invention relates to an all-purpose seasoning soy sauce composition, an all-purpose seasoning soy sauce manufactured using the same, and a method of manufacturing the same. The present invention also relates to an all-purpose seasoning soy sauce which has an inherently deep soy sauce flavor, imparts a sweet and sour taste, removes the fatty smell or fishy smell generated from fish or meat, is suitable for any dishes, improves the flavor of dishes, and is usable as a cham sauce.

4 Claims, No Drawings

ALL-PURPOSE SEASONING SOY SAUCE COMPOSITION, ALL-PURPOSE SEASONING SOY SAUCE, PREPARATION METHOD THEREFOR AND CHAM SAUCE USING SAME

TECHNICAL FIELD

The present invention relates to a natural all-purpose seasoning soy sauce, which is used as seasoning for fish dishes, bulgogi dishes, or soup dishes and is also used as a cham sauce, into which meat is dipped, when eating meat, to a composition used to manufacture the same, and to a method of manufacturing an all-purpose seasoning soy sauce using the same.

BACKGROUND ART

A conventional soy sauce, which is usually most widely used, is a traditional Korean seasoning that is used in various ways in various foods. The conventional soy sauce is manufactured using a manufacturing method that includes boiling soybeans to form a soybean brick including solid materials, naturally fermenting the soybean brick for a predetermined period of time, dipping the soybean brick in salt water, aging the soybean brick with charcoal and pepper floating in salt water, and separating and filtering a fermented solution, followed by boiling and simmering.

With the development of various dishes, various soy sauces suitable for dishes to be prepared have been developed by applying conventional soy sauces. For example, prior patents relate to a method of manufacturing a soy sauce for pork bulgogi of any one among pork shoulder, pork sirloin, pork tenderloin, pork belly, loin, leg meat, ribs, neck bones, skirt meat, or pork shank. The technologies of the prior patents disclose that the method of manufacturing the soy sauce for pork bulgogi includes mixing a fermented soy sauce with any one of water, which is available for use in food, of a meat broth obtained by boiling pork bones or fresh water to perform dilution, adding any one pine ingredient among pine pollen, pine resin, pine lightwood, pine rhizodermis, pine bark, pine shoots, resinous knots of a pine tree, pine seeds, or pine needles, together with vegetables, fruits, and spices, to a caldron, heating the resultant solution to perform vaporization and concentration, and filtering the concentrated solution using a sieve or a filtering device to thus manufacture a soy sauce containing the pine ingredient as a filtrate from which solid materials are removed. The method also includes injecting raw cheonggukjang or natto into the soy sauce containing the pine ingredient so that the soy sauce is fermented by the microorganisms contained in the cheonggukjang or natto, aging the soy sauce to manufacture a fermented soy sauce, adding vinegar to the fermented soy sauce, to which alcohol and saccharides are added, so that a pH is in the range of 4.5 to 6, heating the resultant soy sauce to thus boil the soy sauce for 10 to 20 minutes, cooling the boiled soy sauce to room temperature, and adding carbonated beverages so that the salt concentration is in the range of 1 to 6 wt %, thus manufacturing the soy sauce for pork bulgogi.

In addition to this, various sauces have been developed using a soy sauce, which is a traditional seasoning, such as developing a soy sauce using fermented products of *Dendropanax morbiferus* H. Lev. or developing a soy sauce from fermented soybean water using deep sea water.

However, the conventional soy sauce has problems in that the manufacturing process thereof is quite difficult and complicated and in that the range of applicable dishes is somewhat limited.

CITATION LIST

Patent Literature (Patent Document 1) Korean Patent Application Publication No. 2017-0011418 (Laid-open date: Feb. 2, 2017)
(Patent Document 2) Korean Patent No. 10-1507820 (Publication date: Mar. 26, 2015)
(Patent Document 3) Korean Patent No. 10-1557146 (Publication date: Sep. 24, 2015)

DISCLOSURE

Technical Problem

Therefore, the present inventors have tried to develop a soy sauce that is applicable to various dishes, and accordingly found the optimum composition and compositional ratio required for manufacturing an all-purpose soy sauce which removes the fatty smell or fishy smell generated from fish or meat, is suitable for any dishes, and improves the flavor of dishes, thereby accomplishing the present invention. That is, the present invention provides an all-purpose soy sauce composition, an all-purpose soy sauce manufactured using the same, and a method of manufacturing the same.

Technical Solution

In order to accomplish the above object, an all-purpose soy sauce composition of the present invention includes a fermented soy sauce, a Korean soy sauce, an enzymatically decomposed seasoning solution, fructooligosaccharide, sugar, a fermented fruit liquid, a licorice extract solution, a green tea extract solution, and purified water.

Further, the present invention provides an all-purpose seasoning soy sauce obtained by aging and fermenting a mixture of the above-described composition.

Further, the present invention provides a method of manufacturing an all-purpose seasoning soy sauce using the above-described composition. The method includes performing a process that includes a first step of adding sugar and fructooligosaccharide to a mixed soy sauce including a fermented soy sauce and a Korean soy sauce mixed therein with agitation, followed by heating, thus manufacturing a decocted soy sauce, a second step of filtering the decocted soy sauce using UF (ultra filtration) to manufacture a filtrate, a third step of mixing and agitating the filtrate, purified water, an enzymatically decomposed seasoning solution, a fermented fruit liquid, a licorice extract solution, a green tea extract solution, and purified water to manufacture a mixed solution, a fourth step of aging and fermenting the mixed solution to manufacture a fermented solution, and a fifth step of filtering the fermented solution using UF (ultra filtration).

Further, the present invention provides a cham sauce using the all-purpose seasoning soy sauce.

Advantageous Effects

An all-purpose seasoning soy sauce of the present invention is manufactured using a composition having an optimum composition and compositional ratio, unlike a conventional soy sauce having acerbity. Since the composition is appropriately aged and/or fermented, the all-purpose seasoning soy sauce has an inherently deep soy sauce flavor, imparts a sweet and sour taste, removes the fatty smell or fishy smell generated from fish or meat, is suitable for any dishes, and improves the flavor of dishes.

BEST MODE

Hereinafter, the present invention will be described in more detail.

The composition used to manufacture the all-purpose seasoning soy sauce of the present invention includes a filtrate, an enzymatically decomposed seasoning solution, a fermented fruit liquid, a licorice extract solution, a green tea extract solution, and purified water.

The content of the filtrate in the all-purpose seasoning soy sauce composition may be 55 to 62 wt %, preferably 56.5 to 62 wt %, and more preferably 57 to 60 wt % based on the total weight of the composition. When the amount of the filtrate used in the composition is less than 55 wt %, there may be a problem in that the umami taste is insufficient. When the amount is more than 62 wt %, there may be a problem in that the overall flavor is not balanced.

The filtrate of the ingredients of the all-purpose seasoning soy sauce composition is a liquid obtained by heating a mixture of a mixed soy sauce, sugar, and fructooligosaccharide to manufacture a decocted soy sauce, followed by filtration.

The mixed soy sauce of the filtrate is obtained by mixing a fermented soy sauce (or a brewed soy sauce) and a Korean soy sauce (or a soy sauce for soup) at a weight ratio of 1:0.5 to 1, and preferably 1:0.7 to 1. When the weight ratio of the Korean soy sauce is less than 0.5 based on the weight ratio of the fermented soy sauce, there may be a problem in that the characteristic flavor caused by fermentation and aging of a soybean brick, which is a raw material of the Korean soy sauce, is poor. When the weight ratio of the Korean soy sauce is more than 1 based thereon, there may be a problem in that the characteristic fermentation smell of the Korean soy sauce becomes strong due to fermentation and aging of the soybean brick, causing a severe odor. Therefore, it is preferable to use a weight ratio within the above range.

In addition, the sugar of the ingredients of the filtrate may be one or more selected from among organic sugar, white sugar, and brown sugar, preferably one or more selected from among organic sugar and brown sugar, and more preferably organic sugar. In addition, with respect to the amount of sugar that is used, the sugar is used in an amount of 5 to 15 parts by weight, preferably 6 to 12 parts by weight, and more preferably 6.5 to 10.5 parts by weight based on 100 parts by weight of the mixed soy sauce. When the amount of the sugar that is used is less than 5 parts by weight, since the sweet taste is weak from a sensory aspect, there may be a problem of harmony with the taste of the amino acid contained in the soy sauce. When the amount is more than 15 parts by weight, since the sweet taste is strong, there may be a problem in that the characteristic taste of the amino acid of the soy sauce is reduced.

Further, the fructooligosaccharide of the ingredients of the filtrate is used in place of starch syrup to thus play a role in helping the proliferation of beneficial bacteria, suppression of harmful bacteria, absorption of calcium, and smooth defecation activity in the present invention. In addition, with respect to the amount of the fructooligosaccharide that is used, the fructooligosaccharide is used in an amount of 8 to 20 parts by weight, preferably 8 to 16 parts by weight, and more preferably 8.5 to 15 parts by weight based on 100 parts by weight of the mixed soy sauce. When the amount of the fructooligosaccharide that is used is less than 8 parts by weight, there may be a problem in that the physical properties (viscosity) of the all-purpose seasoning soy sauce and the cham sauce using the same are poor. When the amount is more than 20 parts by weight, the physical properties (viscosity) are large, causing a problem of reduced merchantability of the product.

Next, the enzymatically decomposed seasoning solution of the ingredients of the all-purpose seasoning soy sauce composition is an extract obtained by heating a mixture which includes 75 to 85 wt % of flakes including dried kelp, dried anchovies, dried pollack, dried shrimp, dried shiitake mushrooms, dried onions, dried garlic, and dried large green onions, and 15 to 25 wt % of raw daikon radish, and preferably a mixture which includes 77 to 82 wt % of flakes and a remaining amount of raw daikon radish. When the content of the flakes in the mixture before heating is less than 75 wt %, there may be a problem in that the umami taste of the enzymatically decomposed seasoning solution is reduced from a sensory aspect. When the content is more than 85 wt %, there may be a problem in that the umami taste is excessive and thus the flavor is not balanced.

In addition, with respect to the amount of the enzymatically decomposed seasoning solution that is used in the all-purpose seasoning soy sauce composition, the enzymatically decomposed seasoning solution is used in an amount of 12 to 17 wt %, preferably 13.5 to 17 wt %, and more preferably 14 to 16.5 wt % based on the total weight of the composition. When the content of the enzymatically decomposed seasoning solution is less than 12 wt %, the flavor of the all-purpose seasoning soy sauce may be reduced. When the content is more than 17 wt %, there may be a problem in that the flavor of the all-purpose seasoning soy sauce is excessive and thus the balance of the product is not ensured.

Further, the flakes used to manufacture the enzymatically decomposed seasoning solution may be mixed flakes obtained by mixing dried kelp, dried anchovies, dried pollack, dried shrimp, dried shiitake mushrooms, dried onions, dried garlic, and dried large green onions and then pulverizing the mixture to perform flaking, or by separately flaking individual materials.

With respect to the content of each of the materials contained in the flakes, the flakes may include, based on 100 parts by weight of the dried kelp, 80 to 90 parts by weight of the dried anchovies, 60 to 80 parts by weight of the dried pollack, 15 to 28 parts by weight of the dried shrimp, 70 to 80 parts by weight of the dried shiitake mushrooms, 10 to 30 parts by weight of the dried onions, 10 to 25 parts by weight of the dried garlic, and 5 to 20 parts by weight of the dried large green onions. Preferably, the flakes may include, based on 100 parts by weight of the dried kelp, 83 to 88 parts by weight of the dried anchovies, 70 to 80 parts by weight of the dried pollack, 22 to 28 parts by weight of the dried shrimp, 72 to 77 parts by weight of the dried shiitake mushrooms, 12 to 23 parts by weight of the dried onions, 10 to 20 parts by weight of the dried garlic, and 5 to 15 parts by weight of the dried large green onions.

In addition, the enzymatically decomposed seasoning solution may be manufactured by performing a step of heating a mixture including the flakes and the raw daikon radish cut to a thickness of 3 to 5 cm mixed with each other at 70 to 90 C for 0.3 to 0.8 hours, and preferably at 75 to 85 C for 0.4 to 0.6 hours, thus killing harmful microorganisms in the materials, a step of heating the mixture at 100 to 120 C for 1.2 to 1.8 hours to obtain an extract solution, a step of enzymatically decomposing the sterilized mixture (45±3 C, 4±0.5 hours, protease, cellulase), a step of heating the enzymatically decomposed mixture at a temperature of 80 to 87 C and preferably 83 to 87 C for 10 to 20 minutes and preferably 12 to 18 minutes in order to inactivate the mixture, and a step of filtering the seasoning solution.

When the enzymatically decomposed seasoning solution is manufactured, in the step of obtaining the extract solution, the presence or absence of a process of killing the harmful microorganisms in the materials as a pre-treatment process may influence the quality of the seasoning solution. When there is no sterilization process, there is a problem in that a bad taste (fishy taste) and a bad odor (fatty smell or fishy smell) are generated due to the effect of harmful microorganisms in the materials.

In addition, the filtration may be performed using a typical method used in the art. Preferably, UF (ultra filtration) may be performed to remove unwanted impurities and also remove the fishy smell that may be present in the enzymatically decomposed seasoning solution due to the nature of the enzymatically decomposed seasoning solution, which contains a lot of seafood materials.

Next, the fermented fruit liquid of the ingredients of the all-purpose seasoning soy sauce composition is used in order to impart a pure sweet taste and a sweet and sour taste to the all-purpose seasoning soy sauce. The fermented fruit liquid may include a fermented solution obtained by fermenting a mixture which includes 23 to 28 wt % of pears, 10 to 17 wt % of apples, 13 to 20 wt % of pineapples, to 25 wt % of kiwi fruits, and a remaining amount of Japanese apricot juice, and preferably a mixture which includes 24 to 27 wt % of pears, 12 to 16.5 wt % of apples, 14 to 18.5 wt % of pineapples, 18 to 24 wt % of kiwi fruits, and a remaining amount of Japanese apricot juice.

In addition, the content of the fermented fruit liquid in the composition may be, based on the total weight of the all-purpose seasoning soy sauce composition, 2 to 5 wt %, preferably 2.5 to 4.5 wt %, and more preferably 2.5 to 4 wt %. When the content of the fermented fruit liquid is less than 2 wt %, the fresh taste of the all-purpose seasoning soy sauce may be reduced. When the content is more than 5 wt %, since the all-purpose seasoning soy sauce tastes so sweet that the overall flavor is deteriorated, it is preferable to use the fermented fruit liquid in a content within the above range.

The fermented fruit liquid may be manufactured by performing a process that includes adding the Japanese apricot juice to a fruit mix including the pears, the apples, the pineapples, and the kiwi fruits, which are cut to predetermined sizes, thus manufacturing a mixed solution, fermenting the mixed solution to manufacture a fermented solution, and filtering the fermented solution.

The fermentation may be performed in a dark place at 22 to 28 C for 70 to 76 hours and preferably at 24 to 26 C for 70 to 74 hours.

In addition, the filtration may be performed using a typical method used in the art. Preferably, UF (ultra filtration) may be performed to remove unwanted components such as seeds that are present in fruit.

Next, the licorice extract of the ingredients of the all-purpose seasoning soy sauce composition is used to impart a natural sweet taste. The content of the licorice extract in the composition may be 1 to 2.5 wt %, preferably 1.5 to 2.5 wt %, and more preferably 1.7 to 2.3 wt %. When the content of the licorice extract is less than 1 wt %, it is not possible to impart the natural sweet taste. When the content is more than 2.5 wt %, there may be a problem in that the all-purpose seasoning soy sauce product exudes a bad odor due to the characteristic flavor of licorice.

Next, the green tea extract of the ingredients of the all-purpose seasoning soy sauce composition is used in order to inhibit the growth and development of harmful microorganisms that may be present in the all-purpose seasoning soy sauce and to remove a bad odor. The content of the green tea extract in the composition may be 0.5 to 1 wt %, preferably 0.65 to 1 wt %, and more preferably 0.7 to 0.9 wt %. When the content of the licorice extract is less than 0.5 wt %, the effect of use of the extract cannot be ensured. When the content is more than 1 wt %, the all-purpose seasoning soy sauce may have a slightly astringent taste due to the use of an excessive amount of green tea extract. Accordingly, it is preferable to use the green tea extract in an amount within the above range.

A method of manufacturing an all-purpose seasoning soy sauce using the all-purpose seasoning soy sauce composition of the present invention described in detail above will be described.

The method of manufacturing the all-purpose seasoning soy sauce of the present invention may include performing a process that includes a first step of adding sugar and a fructooligosaccharide to a mixed soy sauce including a fermented soy sauce and a Korean soy sauce mixed therein with agitation, followed by heating, thus manufacturing a decocted soy sauce, a second step of filtering the decocted soy sauce using UF (ultra filtration) to manufacture a filtrate, a third step of mixing and agitating the filtrate, purified water, an enzymatically decomposed seasoning solution, a fermented fruit liquid, a licorice extract solution, a green tea extract solution, and purified water to manufacture a mixed solution, a fourth step of aging and fermenting the mixed solution to manufacture a fermented solution, and a fifth step of filtering the fermented solution.

The heating of the first step is performed in order to heat the soy sauces, the sugar, and the fructooligosaccharide so that an aminocarbonyl reaction occurs, thus further improving the flavor of the soy sauce. The heating may be performed at 98 to 110 C, preferably 98 to 105 C, and more preferably 98 to 102 C for 20 to 40 minutes, and preferably 25 to 35 minutes. When the heating temperature is higher than 110 C, there may be a problem in that a carbonization odor occurs. Accordingly, it is preferable to perform the heating at a temperature within the above range.

In addition, the amounts (contents) of the compositions used in the first to third steps and the methods of manufacturing the enzymatically decomposed seasoning solution and the fermented fruit liquid are as described above.

The aging and the fermentation of the fourth step may be performed in a dark place at 22 to 28 C for 70 to 76 hours, and preferably at 24 to 26 C for 70 to 74 hours.

Further, the fermented solution may be sterilized before the UF of the fifth step. This is to inactivate an enzyme after the fermentation is completed. The sterilization may be performed by heating the fermented solution at a temperature of 80 to 87 C, and preferably 83 to 87 C, for 10 to 20 minutes, and preferably 12 to 18 minutes. The sterilization treatment is an optional process rather than an essential process.

Next, the filtration of the sixth step may be performed using a typical method used in the art. Preferably, UF (ultra filtration) may be performed to remove unwanted impurities and various tastes (bad tastes and bad smells) that may be present in the manufactured all-purpose cooking soy sauce.

The all-purpose seasoning soy sauce of the present invention manufactured using the above-described composition and method has an inherently deep soy sauce flavor, imparts a sweet and sour taste, removes the fatty smell or fishy smell generated from fish or meat, is suitable for any dishes, and improves the flavor of dishes. Particularly, the all-purpose seasoning soy sauce may be used as a cham sauce, into which meat is dipped, when eating meat, thus improving the taste and flavor of meat.

Mode for Invention

Hereinafter, the present invention will be described in more detail through Examples. These Examples are only for illustrating the present invention, and it will be apparent to those skilled in the art that the scope of the present invention is not interpreted to be limited by these Examples.

EXAMPLE

Preparation Example 1-1: Manufacture of Filtrate

A fermented soy sauce and a Korean soy sauce were mixed at a weight ratio of 1:0.96 to prepare a mixed soy sauce.

Next, 8.2 parts by weight of organic sugar and 10.2 parts by weight of fructooligosaccharide were mixed based on 100 parts by weight of the mixed soy sauce and then heated at 100 to 102 C for 30 minutes to cause an aminocarbonyl reaction, thereby manufacturing a decocted soy sauce.

Next, the decocted soy sauce was filtered using a cloth to manufacture a filtrate.

Preparation Example 1-2 and Comparative
Preparation Examples 1-1 to 1-2

Preparation Example 1-2 and Comparative Preparation Examples 1-1 to 1-3 were performed using the same method as in Preparation Example 1-1 to manufacture filtrates, except that the composition was changed as shown in Table 1 below. However, in Comparative Preparation Example 1-3, after the compositions of Table 1 were mixed, heating was performed with agitation at about 45 to 50 C enough to sufficiently dissolve the sugar and fructooligosaccharide in a mixed soy sauce, but not to cause an aminocarbonyl reaction.

TABLE 1

| Classification | Preparation Example 1-1 | Preparation Example 1-2 | Comparative Preparation Example 1-1 | Comparative Preparation Example 1-2 | Comparative Preparation Example 1-3 |
|---|---|---|---|---|---|
| Weight ratio of fermented soy sauce: Korean soy sauce | 1:0.96 | 1:0.70 | 1:0.2 | 1:1.5 | 1:0.96 |
| Mixed soy sauce | 100 parts by weight | 100 parts by weight | 100 parts by weight | 100 parts by weight | 100 parts by weight |
| Organic sugar | 8.2 parts by weight | 6.6 parts by weight | 8.2 parts by weight | 8.2 parts by weight | 8.2 parts by weight |
| Fructooligosaccharide | 10.2 parts by weight | 15 parts by weight | 10.2 parts by weight | 10.2 parts by weight | 10.2 parts by weight |
| Presence or absence of heating | ○ | ○ | ○ | ○ | X |

Preparation Example 2-1: Manufacture of Enzymatically Decomposed Seasoning Solution Mixed flakes having the composition shown in the following Table 2 were prepared.
Next, a mixture in which 80 wt % of the mixed flake and 20 wt % of raw daikon radish cut to a thickness of 3 to 5 cm were mixed was prepared.
Next, heating was performed at 75 to 85 C for 0.4 to 0.6 hours in order to remove harmful microorganisms in the mixture (material). Next, the sterilized mixture was enzymatically decomposed (at 45±3 C for 4±0.5 hours, protease, cellulase). Next, the enzymatically decomposed mixture was heated for 12 to 18 minutes so as to be inactivated. Next, the seasoning solution in which the enzyme was inactivated was filtered and cooled to obtain an extract solution.
Next, the obtained fermented solution was subjected to UF (ultra filtration) (50 mesh) to obtain an enzymatically decomposed seasoning solution.

Preparation Examples 2-2 to 2-4 and Comparative Preparation Examples 2-1 to 2-3

Preparation Examples 2-2 to 2-4 and Comparative Preparation Examples 2-1 to 2-5 were performed using the same method as in Preparation Example 2-1 to manufacture enzymatically decomposed seasoning solutions, except that the composition was changed as shown in Tables 2 and 3 below.

TABLE 2

| Classification | Preparation Example 2-1 | Preparation Example 2-2 | Preparation Example 2-3 | Preparation Example 2-4 |
|---|---|---|---|---|
| Dried kelp | 100 parts by weight | 100 parts by weight | 100 parts by weight | 100 parts by weight |
| Dried anchovies | 85 parts by weight | 85 parts by weight | 85 parts by weight | 88 parts by weight |
| Dried pollack | 75 parts by weight | 75 parts by weight | 75 parts by weight | 71 parts by weight |
| Dried shrimp | 25 parts by weight | 25 parts by weight | 25 parts by weight | 28 parts by weight |
| Dried shiitake mushrooms | 75 parts by weight | 75 parts by weight | 75 parts by weight | 72 parts by weight |
| Dried onions | 15 parts by weight | 15 parts by weight | 15 parts by weight | 19 parts by weight |
| Dried garlic | 15 parts by weight | 15 parts by weight | 15 parts by weight | 17 parts by weight |
| Dried large green onions | 10 parts by weight | 10 parts by weight | 10 parts by weight | 8 parts by weight |
| Mixed flakes | 80 wt % | 76 wt % | 82 wt % | 80 wt % |
| Raw daikon radish | 20 wt % | 24 wt % | 18 wt % | 20 wt % |

TABLE 3

| Classification | Comparative Preparation Example 2-1 | Comparative Preparation Example 2-2 | Comparative Preparation Example 2-3 | Comparative Preparation Example 2-4 | Comparative Preparation Example 2-5 |
|---|---|---|---|---|---|
| Dried kelp | 100 parts by weight | 100 parts by weight | 100 parts by weight | 100 parts by weight | 100 parts by weight |
| Dried anchovies | 85 parts by weight | 85 parts by weight | 100 parts by weight | 60 parts by weight | 85 parts by weight |

TABLE 3-continued

| Classification | Comparative Preparation Example 2-1 | Comparative Preparation Example 2-2 | Comparative Preparation Example 2-3 | Comparative Preparation Example 2-4 | Comparative Preparation Example 2-5 |
|---|---|---|---|---|---|
| Dried pollack | 75 parts by weight | 75 parts by weight | 95 parts by weight | 60 parts by weight | 75 parts by weight |
| Dried shrimp | 25 parts by weight | 25 parts by weight | 25 parts by weight | 25 parts by weight | 25 parts by weight |
| Dried shiitake mushrooms | 75 parts by weight | 75 parts by weight | 75 parts by weight | 75 parts by weight | 50 parts by weight |
| Dried onions | 15 parts by weight | 15 parts by weight | 15 parts by weight | 15 parts by weight | 8 parts by weight |
| Dried garlic | 15 parts by weight | 15 parts by weight | 15 parts by weight | 15 parts by weight | 15 parts by weight |
| Dried large green onions | 10 parts by weight | 10 parts by weight | 10 parts by weight | 10 parts by weight | 10 parts by weight |
| Mixed flakes | 70 wt % | 88 wt % | 80 wt % | 80 wt % | 80 wt % |
| Raw daikon radish | 30 wt % | 12 wt % | 20 wt % | 20 wt % | 20 wt % |

Preparation Example 3-1: Manufacture of Fermented Fruit Liquid

Pears, apples, pineapples, and kiwi fruits were sliced to prepare a fruit mix. Next, after Japanese apricot juice was added to the fruit mix to manufacture a mixed solution, the mixed solution was put into a container and then sealed with plastic.

Next, the container was left in a dark place at 24 to 25 C for 72 hours so as to ferment the mixed solution in the container.

Next, the fermented product was subjected to UF (50 mesh) to obtain a fermented fruit liquid.

In addition, the amounts of fruits and Japanese apricot juice used to manufacture the fermented fruit liquid are shown in Table 4 below.

Preparation Example 3-2 and Comparative Preparation Examples 3-1 to 3-3: Manufacture of Fermented Fruit Liquid Preparation Example 3-2 and Comparative Preparation Examples 3-1 to 3-3 were performed using the same method as in Preparation Example 3-1 to manufacture fermented fruit liquids, except that the composition was changed as shown in Table 4 below. However, the fermentation process was not performed in Comparative Preparation Example 3-3.

TABLE 4

| Classification | Preparation Example 3-1 | Preparation Example 3-2 | Comparative Preparation Example 3-1 | Comparative Preparation Example 3-2 | Comparative Preparation Example 3-3 |
|---|---|---|---|---|---|
| Pears | 25.0 wt % | 26.5 wt % | 15.0 wt % | 25.0 wt % | 25.0 wt % |
| Apples | 15.0 wt % | 13.5 wt % | 15.0 wt % | 15.0 wt % | 15.0 wt % |
| Pineapples | 15.0 wt % | 18.0 wt % | 15.0 wt % | 5.0 wt % | 15.0 wt % |
| Kiwi fruits | 20.0 wt % | 23.0 wt % | 20.0 wt % | 20.0 wt % | 20.0 wt % |
| Japanese apricot juice | Remaining balance | Remaining balance | Remaining balance | Remaining balance | Remaining balance |
| Sum total | 100.0 wt % | 100.0 wt % | 100.0 wt % | 100.0 wt % | 100.0 wt % |
| Presence or absence of fermentation | ○ | ○ | ○ | ○ | X |

Example 1: Manufacture of All-Purpose Seasoning Soy Sauce

The filtrate of Preparation Example 1-1, the enzymatically decomposed seasoning solution of Preparation Example 2-1, the fermented fruit liquid of Preparation Example 3-1, a licorice extract solution, a green tea extract solution, and purified water were mixed with the compositions and composition ratios shown in the following Table 5, thus manufacturing a mixed solution.

Next, the mixed solution was put into a container and then sealed with plastic.

Next, the container was left in a dark place at 24 to 25 C for 72 hours so as to age and ferment the mixed solution in the container, thus manufacturing a fermented solution.

Next, the fermented solution was sterilized at about 85 C for 15 minutes so that an enzyme was inactivated, thus preventing further fermentation.

Next, the fermented product was subjected to UF (50 mesh) to manufacture an all-purpose seasoning soy sauce.

Examples 2 to 6 and Comparative Examples 1 to 11

Examples 2 to 6 and Comparative Examples 1 to 11 were performed using the same method as in Example 1 to manufacture all-purpose seasoning soy sauces, except that the composition was as shown in Tables 5 to 7 below.

TABLE 5

| Classification | Example 1 | Example 2 | Example 3 | Example 4 | Example 5 | Example 6 |
| --- | --- | --- | --- | --- | --- | --- |
| Filtrate | Preparation Example 1-1 58 wt % | Preparation Example 1-2 58 wt % | Preparation Example 1-1 58 wt % | Preparation Example 1-1 58 wt % | Preparation Example 1-1 60 wt % | Preparation Example 1-1 57 wt % |
| Enzymatically decomposed seasoning solution | Preparation Example 2-1 15 wt % | Preparation Example 2-1 15 wt % | Preparation Example 2-2 15 wt % | Preparation Example 2-1 15 wt % | Preparation Example 2-1 13.5 wt % | Preparation Example 2-1 15.8 wt % |
| Fermented fruit liquid | Preparation Example 3-1 3 wt % | Preparation Example 3-1 3 wt % | Preparation Example 3-1 3 wt % | Preparation Example 3-2 3 wt % | Preparation Example 3-1 2.8 wt % | Preparation Example 3-1 3.3 wt % |
| Licorice extract solution | 2 wt % | 2 wt % | 2 wt % | 2 wt % | 2.2 wt % | 2 wt % |
| Green tea extract solution | 0.8 wt % | 0.8 wt % | 0.8 wt % | 0.8 wt % | 0.7 wt % | 0.9 wt % |
| Purified water | Remaining balance | Remaining balance | Remaining balance | Remaining balance | Remaining balance | Remaining balance |
| Sum total | 100 wt % | 100 wt % | 100 wt % | 100 wt % | 100 wt % | 100 wt % |

TABLE 6

| Classification | Comparative Example 4 | Comparative Example 5 | Comparative Example 6 |
| --- | --- | --- | --- |
| Filtrate | Preparation Example 1-1 58 wt % | Preparation Example 1-1 58 wt % | Preparation Example 1-1 58 wt % |
| Enzymatically decomposed seasoning solution | Comparative Preparation Example 2-1 15 wt % | Comparative Preparation Example 2-2 15 wt % | Comparative Preparation Example 2-3 15 wt % |
| Fermented fruit liquid | Preparation Example 3-1 3 wt % | Preparation Example 3-1 3 wt % | Preparation Example 3-1 3 wt % |
| Licorice extract solution | 2 wt % | 2 wt % | 2 wt % |
| Green tea extract solution | 0.8 wt % | 0.8 wt % | 0.8 wt % |
| Purified water | Remaining balance | Remaining balance | Remaining balance |
| Sum total | 100 wt % | 100 wt % | 100 wt % |

TABLE 7

| Classification | Comparative Example 7 | Comparative Example 8 | Comparative Example 9 | Comparative Example 10 | Comparative Example 11 |
|---|---|---|---|---|---|
| Filtrate | Preparation Example 1-1 58 wt % | Preparation Example 1-1 58 wt % | Preparation Example 1-1 58 wt % | Preparation Example 1-1 58 wt % | Preparation Example 1-1 58 wt % |
| Enzymatically decomposed seasoning solution | Comparative Preparation Example 2-4 15 wt % | Comparative Preparation Example 2-5 15 wt % | Preparation Example 2-1 15 wt % | Preparation Example 2-1 15 wt % | Preparation Example 2-1 15 wt % |
| Fermented fruit liquid | Preparation Example 3-1 3 wt % | Preparation Example 3-1 3 wt % | Comparative Preparation Example 3-1 3 wt % | Comparative Preparation Example 3-2 3 wt % | Comparative Preparation Example 3-3 3 wt % |
| Licorice extract solution | 2 wt % | 2 wt % | 2 wt % | 2 wt % | 2 wt % |
| Green tea extract solution | 0.8 wt % | 0.8 wt % | 0.8 wt % | 0.8 wt % | 0.8 wt % |
| Purified water | Remaining balance | Remaining balance | Remaining balance | Remaining balance | Remaining balance |
| Sum total | 100 wt % | 100 wt % | 100 wt % | 100 wt % | 100 wt % |

Experimental Example: Sensory Evaluation

Sensory evaluation was performed on the savory taste, saltiness, sweet taste, aroma, and overall preferability of the all-purpose soy sauces manufactured in the Examples and Comparative Examples, and the results are shown in Table 8 below. A total of 50 men and women in their twenties to fifties participated as panels in the sensory evaluation, the evaluation was performed using a five-point scale method, and an average value thereof was calculated for evaluation.

TABLE 8

| Classification | Umami taste | Saltiness | Sweet taste | Acerbity | Aroma | Overall preferability |
|---|---|---|---|---|---|---|
| Example 1 | 4.8 | 4.6 | 4.5 | 4.8 | 4.8 | 4.7 |
| Example 2 | 3.0 | 3.8 | 4.3 | 4.6 | 4.5 | 4.04 |
| Example 3 | 2.4 | 4.5 | 4.2 | 4.5 | 4.2 | 3.96 |
| Example 4 | 2.5 | 4.5 | 4.3 | 3.8 | 3.8 | 3.78 |
| Example 5 | 2.0 | 4.5 | 4.1 | 4.0 | 4.0 | 3.72 |
| Example 6 | 3.1 | 4.2 | 4.2 | 4.5 | 4.1 | 4.02 |
| Comparative Example 4 | 2.2 | 4.2 | 4.3 | 4.2 | 4.3 | 3.84 |
| Comparative Example 5 | 3.0 | 4.0 | 4.2 | 4.3 | 4.4 | 3.98 |
| Comparative Example 6 | 3.3 | 4.0 | 4.3 | 4.5 | 4.3 | 4.08 |
| Comparative Example 7 | 3.0 | 3.9 | 4.2 | 4.3 | 4.2 | 3.92 |
| Comparative Example 8 | 2.7 | 4.0 | 4.1 | 4.3 | 3.9 | 3.8 |
| Comparative Example 9 | 2.9 | 4.3 | 4.2 | 4.3 | 4.0 | 3.94 |
| Comparative Example 10 | 3.0 | 4.3 | 4.3 | 4.2 | 4.3 | 4.02 |
| Comparative Example 11 | 2.8 | 4.2 | 4.0 | 2.8 | 3.5 | 3.46 |

The invention claimed is:

1. An all-purpose seasoning soy sauce as a fermented product obtained by aging and fermenting a mixture of an all-purpose seasoning soy sauce composition,
wherein the all-purpose seasoning soy sauce composition includes 55 to 62 wt % of a filtrate, 12 to 17 wt % of an enzymatically decomposed seasoning solution, 2 to 5 wt % of a fermented fruit liquid, 1 to 2.5 wt % of a licorice extract, 0.5 to 1 wt % of a green tea extract, and a remaining amount of purified water, wherein the wt % is a weight percent based on the total weight of the composition,
the filtrate is obtained by heating and filtering a mixture which includes 5 to 15 parts by weight of sugar and 8 to 20 parts by weight of a fructooligosaccharide mixed therein based on 100 parts by weight of a mixed soy sauce including a fermented soy sauce and a Korean soy sauce, the fermented soy sauce and the Korean soy sauce being included at a weight ratio of from 1:0.5 to 1:1,
the enzymatically decomposed seasoning solution is an extract obtained by heating a mixture which includes 75 to 85 wt % of flakes including dried kelp, dried anchovies, dried pollack, dried shrimp, dried shiitake mushrooms, dried onions, dried garlic, and dried large green onions, and 15 to 25 wt % of raw daikon radish, wherein the wt % is a weight percent based on the total weight of the mixture to be heated, and
the fermented fruit liquid includes a fermented solution obtained by fermenting a mixture which includes 23 to 28 wt % of pears, 10 to 17 wt % of apples, 13 to 20 wt % of pineapples, 15 to 25 wt % of kiwi fruits, and a remaining amount of Japanese apricot juice, wherein the wt % is a weight percent based on the total weight of the mixture to be fermented.

2. A method of manufacturing an all-purpose seasoning soy sauce, the method comprising performing a process comprising:
a first step of adding 5 to 15 parts by weight of sugar and 8 to 20 parts by weight of fructooligosaccharide to 100 parts by weight of a mixed soy sauce including a fermented soy sauce and a Korean soy sauce mixed at a weight ratio of from 1:0.5 to 1:1 with agitation, followed by heating, thus manufacturing a decocted soy sauce;
a second step of filtering the decocted soy sauce using UF (ultra filtration) to manufacture a filtrate;
a third step of mixing and agitating 55 to 62 wt % of the filtrate, 12 to 17 wt % of an enzymatically decomposed seasoning solution, 2 to 5 wt % of a fermented fruit liquid, 1 to 2.5 wt % of a licorice extract, 0.5 to 1 wt % of a green tea extract, and a remaining amount of purified water to manufacture a mixed solution, wherein the wt % is a weight percent based on the total weight of the mixed solution;

a fourth step of aging and fermenting the mixed solution to manufacture a fermented solution; and a fifth step of filtering the fermented solution using UF (ultra filtration), wherein the enzymatically decomposed seasoning solution of the third step is manufactured by performing a process that includes heating a mixture, which includes 75 to 85 wt % of flakes including dried kelp, dried anchovies, dried pollack, dried shrimp, dried shiitake mushrooms, dried onions, dried garlic, and dried large green onions, and 15 to 25 wt % of cut raw daikon radish mixed therein, at 100 to 120° C. for 1.2 to 1.8 hours to obtain an extract solution, the wt % being a weight percent based on the total weight of the mixture to be heated, enzymatically decomposing the obtained extract solution, performing sterilization in order to inactivate an enzyme, followed by filtration, thus obtaining the fermented solution (seasoning solution), and filtering the fermented solution (seasoning solution), the fermented fruit liquid of the third step is manufactured by performing a process that includes adding Japanese apricot juice to a fruit mix including pears, apples, pineapples, and kiwi fruits, which are cut to predetermined sizes, thus manufacturing a mixture, fermenting the mixture in a dark place at 22 to 28° C. for 70 to 76 hours to manufacture the fermented solution, and filtering the fermented solution, and the mixture used to manufacture the fermented fruit liquid includes 23 to 28 wt % of the pears, 10 to 17 wt % of the apples, 13 to 20 wt % of the pineapples, 15 to 25 wt % of the kiwi fruits, and a remaining amount of the Japanese apricot juice, wherein the wt % is a weight percent based the on total weight of the mixture used to manufacture the fermented fruit liquid.

3. The method of claim 2, wherein the fifth step includes heating the fermented solution at 83 to 87° C. for 10 to 20 minutes before the UF to perform the sterilization.

4. A cham sauce comprising:
the all-purpose seasoning soy sauce of claim 1.

* * * * *